(12) United States Patent
Werz et al.

(10) Patent No.: US 7,913,386 B2
(45) Date of Patent: Mar. 29, 2011

(54) METHOD OF MANUFACTURING A FLAT GASKET

(75) Inventors: Ulrich Werz, Dettingen (DE); Tobias Gruhler, Pfullingen (DE); Peter Schenk, Hohenstein (DE); Wolfgang Fritz, Metzingen (DE); Willi Brodbeck, Dettingen (DE); Matthias Baur, Roemerstein (DE)

(73) Assignee: ElringKlinger AG, Dettingen (DE)

( * ) Notice: Subject to any disclaimer, the term of this patent is extended or adjusted under 35 U.S.C. 154(b) by 844 days.

(21) Appl. No.: 11/789,540

(22) Filed: Apr. 25, 2007

(65) Prior Publication Data

US 2007/0262536 A1 Nov. 15, 2007

(30) Foreign Application Priority Data

May 9, 2006 (DE) .......................... 10 2006 021 499

(51) Int. Cl.
*B21D 31/00* (2006.01)
*B21D 35/00* (2006.01)
*B21D 53/84* (2006.01)

(52) U.S. Cl. ....... 29/888.3; 29/469.5; 72/377; 72/379.2; 72/379.6; 277/591; 277/593; 277/595

(58) Field of Classification Search .................... 29/445, 29/469.5, 888.3; 72/348, 377, 379.2, 379.6; 277/591, 593, 596, 595
See application file for complete search history.

(56) References Cited

U.S. PATENT DOCUMENTS

| | | | |
|---|---|---|---|
| 1,587,626 A | 6/1926 | Bailey | 277/591 |
| 4,203,608 A * | 5/1980 | Nicholson | 277/595 |
| 5,695,200 A | 12/1997 | Diez | 277/180 |
| 5,875,548 A | 3/1999 | Diez | 29/888.3 |
| 6,148,516 A | 11/2000 | Diez | 29/888.3 |
| 7,000,924 B2 | 2/2006 | Hohe et al. | 277/593 |
| 7,047,617 B2 | 5/2007 | Diez | 29/525 |
| 2002/0063394 A1 | 5/2002 | Furuta et al. | 277/591 |
| 2002/0153666 A1 | 10/2002 | Unseld | 277/593 |
| 2004/0041352 A1 | 3/2004 | Hohe et al. | 277/593 |
| 2006/0097459 A1 | 5/2006 | Hohe et al. | 277/593 |

FOREIGN PATENT DOCUMENTS

| | | |
|---|---|---|
| DE | 195 20 695 C1 | 7/1996 |
| DE | 200 17 774 U1 | 2/2001 |
| DE | 100 60 872 A1 | 1/2002 |
| DE | 201 21 984 U1 | 1/2004 |
| DE | 102 56 896 B4 | 7/2004 |
| DE | 10 2004 033 906 | 2/2006 |
| DE | 10 2006 021 499.4 | 5/2006 |
| EP | 1 298 364 B1 | 4/2003 |

* cited by examiner

*Primary Examiner* — David P Bryant
*Assistant Examiner* — Alexander P Taousakis

(57) ABSTRACT

Flat gasket comprising a first sheet metal layer consisting of a spring steel and a second sheet metal layer consisting of a ductile steel, the first layer being provided with a sealing bead, and the second layer being provided in an edge area bordering on an edge of the layer with a thickened zone as supporting element for receiving pressing forces; to increase the design possibilities for such a supporting element, the latter is formed by at least one elongate arch of the second layer, which is stamped into the edge area of the second layer and extends approximately parallel to the free edge of the edge area, the arch being compressed in such a way that the metal volume of the supporting element is at least three times the total hollow space volume which the supporting element and two tangential planes abutting on the latter and extending parallel to the plane of the second layer include between them.

7 Claims, 13 Drawing Sheets

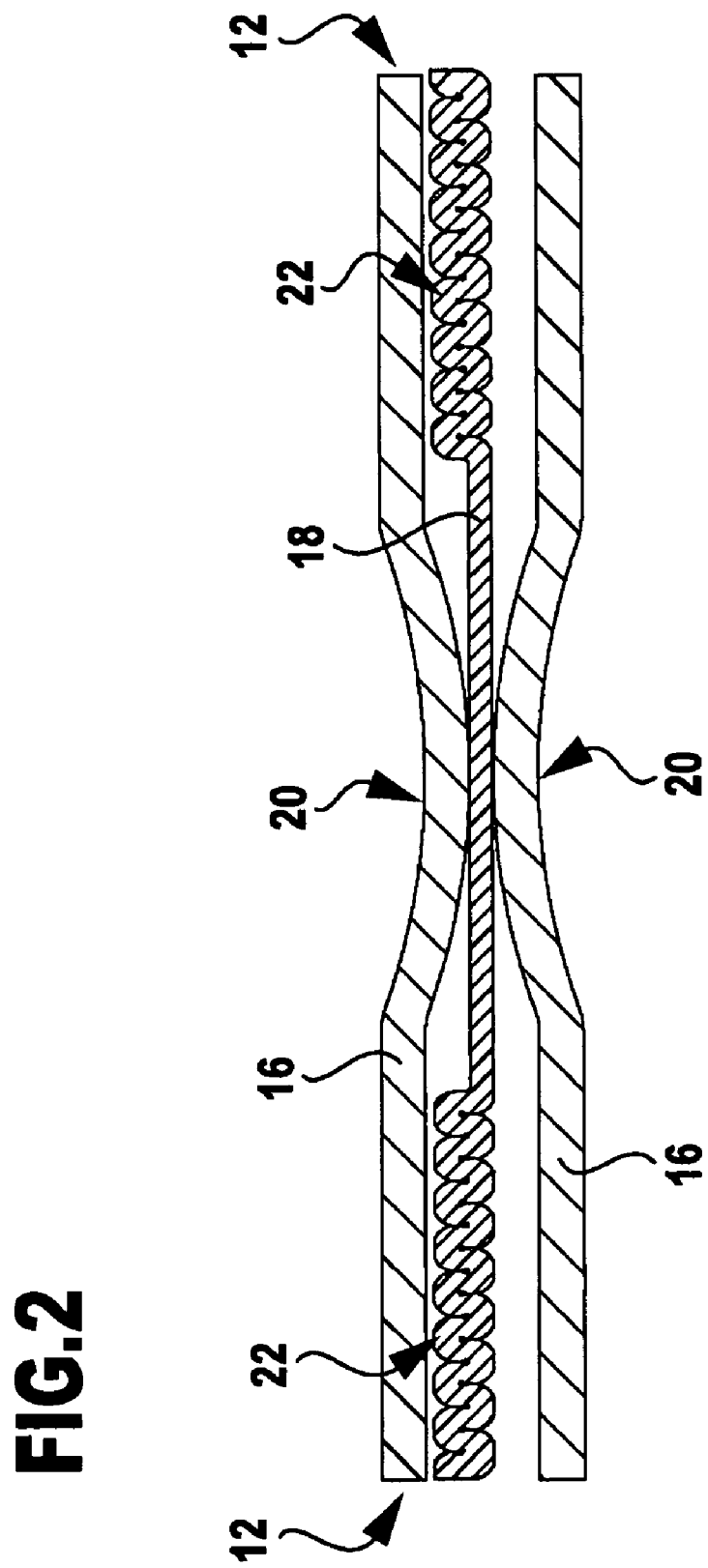

METHOD OF MANUFACTURING A FLAT GASKET

The present disclosure relates to the subject matter disclosed in German application number 10 2006 021 499 of May 9, 2006, which is incorporated herein by reference in its entirety and for all purposes.

BACKGROUND OF THE INVENTION

The invention relates to an at least substantially metallic flat gasket comprising at least one first sheet metal layer consisting of a spring steel and at least one second sheet metal layer consisting of a ductile steel, the first layer being provided with at least one sealing bead, and the second layer being provided in at least one edge area bordering on a free, peripheral or an inner edge of the sheet metal layer with at least one thickened zone as supporting element for receiving pressing forces acting on the flat gasket when the latter is installed.

In particular, the invention relates to such a flat gasket as is designed as cylinder head gasket, and in the following the invention will be explained with reference to cylinder head gaskets, although a flat gasket according to the invention is also suitable for other applications, for example, for a gasket between a cylinder head and an exhaust manifold, or a so-called flange gasket between flanges of two pipes or other components that are to be joined to one another by screws.

Typical of such a flat gasket is, for example, the cylinder head gasket disclosed in US 2002/0063394-A1, which comprises two outer first sheet metal layers consisting of a spring steel and a second sheet metal layer arranged between these. Around the combustion chamber openings of this cylinder head gasket, the two outer first sheet metal layers are provided with sealing beads stamped into these. When installing the cylinder head gasket and while the engine is in operation, the sealing beads are protected against excessive flattenings owing to the pressing forces acting on the cylinder head gasket by the central, second sheet metal layer being provided around the combustion chamber openings with deformation delimiters (so-called stoppers), which are produced by a ring-shaped edge area of the second sheet metal layer having been respectively bent over and back onto the actual sheet metal layer around the combustion chamber openings, so that this edge area forms a ring-shaped, thickened zone. Although an incompressible, thickened supporting element is thereby obtained, this has a number of disadvantages: in the manner described, only a supporting element can be produced whose thickness is equal to twice the sheet thickness of the respective sheet metal layer, but a supporting element of greater thickness would be desirable for many applications. Furthermore, in the manner described, only a supporting element can be produced, whose width (i. e., its radial dimensions in relation to the associated combustion chamber opening) is relatively small, for if one wanted to produce a wider supporting element, the sheet metal would begin to tear from its free edge when folding over the said edge area.

In U.S. Pat. No. 1,587,626 a single-layered cylinder head gasket made from a sheet metal layer is disclosed, wherein the sheet metal layer has respectively been folded several times back onto itself around the combustion chamber openings in such a way that around each combustion chamber opening a thickened ring-shaped sealing element is produced, in whose cross section the sheet metal forms an S-shaped structure or a structure with two nested rings, whose cross section respectively corresponds to a lying U. Apart from this known cylinder head gasket being a single-layered gasket, not consisting of a sheet spring steel owing to the producibility of the sealing elements and, consequently, not being provided with the usual sealing beads that are elastic in the direction of their height, the thickened zones form sealing elements and not supporting elements to be added to sealing elements. Furthermore, in this known cylinder head gasket the thickness of a thickened zone must as a consequence always be a multiple of the sheet thickness, and, in addition, these thickened zones can only be produced with a slight width because the sheet metal would otherwise tear when being folded over.

In single-layered and multi-layered metallic cylinder head gaskets, thickened supporting elements are also used at other locations than around openings of the cylinder head gasket that are to be sealed: in a multi-cylinder engine the usual position of the cylinder head screws has as a consequence that the cylinder head in the area of its narrow sides, i. e., its longitudinal ends, has a tendency to be pulled downwards to a stronger extent, i. e., in the direction towards the engine block; in addition, the high gas pressures prevailing in the combustion chambers when the engine is in operation cause the cylinder head to arch albeit slightly between its longitudinal ends when the engine is in operation. These two effects have already been counteracted by providing the cylinder head gasket in the area of its longitudinal ends with thickened zones which serve as elevated supporting elements for the longitudinal ends of the cylinder head. To produce these supporting elements, tongue-like or lug-like edge areas provided at the periphery of a sheet metal layer of the cylinder head gasket are usually folded over and thereby placed back onto the actual sheet metal layer. In this case, too, the thickness of these supporting elements must as a consequence be equal to twice the thickness of the sheet metal. It is also problematic to produce at an edge area of the sheet metal layer, which in a plan view is round, a supporting element which extends from the edge of the cylinder head gasket over quite a large extent into the interior of the gasket because, as described hereinabove, the sheet metal then tends to tear when being folded over.

The object underlying the invention was to propose a flat gasket of the kind mentioned at the outset, where the design engineer is not governed by the limitations explained hereinabove when designing a supporting element.

SUMMARY OF THE INVENTION

This object is accomplished, in accordance with the invention, in that the supporting element is formed by at least one elongate arch of the second layer consisting of ductile steel, which is stamped into the edge area of the second layer and extends approximately parallel to the free edge of the edge area, and in that the supporting element is compressed in such a way that the metal volume of the supporting element is a multiple of the total hollow space volume that the supporting element and two tangential planes abutting on the latter and extending parallel to the plane of the second layer include between them.

Since such an arch as well as conventional, stamped beads can be readily produced in the desired height, several such arches can also be produced without any difficulty immediately adjacent to one another, and the arch or several arches lying adjacent to one another can be strongly compressed by a suitable pressing tool perpendicularly and/or parallel to the plane of the layers, the invention makes it possible to produce a supporting element with a prescribed desired height and/or width by simple reshaping techniques, which is otherwise only possible with separately produced supporting elements that are welded onto or attached in some other way to a sheet metal layer.

In conjunction with the invention it is pointed out that a sheet spring steel is to be understood as such a sheet steel that guarantees that the sealing bead formed in it will also be elastic in the direction of its height when the flat gasket is installed and under operating conditions—typical such spring steels for the manufacture of cylinder head gaskets are the types of steel with a yield strength Re of more than 1000 N/mm².

On the other hand, a sheet metal layer consisting of a ductile steel is to be understood as such a sheet metal that can undergo permanent plastic deformation by reshaping by means of a stamping tool and/or pressing tool, and typical types of steel for this use are such as have —prior to the reshaping —a yield strength Re of less than 600 N/mm².

It is, however, pointed out that by sufficient compression of the arch or the arches lying adjacent to one another, a supporting element can be produced, which is pressure-resistant and not deformable in its height when subjected to the pressing forces occurring when installing the flat gasket and under operating conditions.

In a plan view of its (i. e. the second) layer, a supporting element according to the invention may have a meandering shape, similarly to the supporting elements shown in FIGS. 17 and 19 of EP-1 298 364-B1.

Additionally to the prior art described hereinabove, reference is made to DE-100 60 872-A1, because FIG. 2 therein shows a three-layered metallic cylinder head gasket in which the two outer sheet metal layers consisting of sheet spring steel comprise for each combustion chamber opening a sealing bead enclosing the latter and projecting in the direction towards the central sheet metal layer, which is provided radially within each sealing bead (in relation to the respective combustion chamber opening) with a deformation delimiter or stopper serving to protect the sealing bead. The stopper is in the form of several beads stamped into the central sheet metal layer, which surround the combustion chamber opening in the shape of a ring and are arranged immediately adjacent to one another, so that the ring area of the central sheet metal layer surrounding the combustion chamber opening has an undulating profile in cross section. However, owing to its shape, this so-called undulating stopper can never be pressure-resistant (i. e., not deformable in its height) under the influence of the pressing forces occurring when installing the cylinder head gasket and when the engine is in operation, nor does the metal volume of the undulating stopper, i. e., the supporting element of this known cylinder head gasket, amount to a multiple (within the meaning of the present invention) of the total hollow space volume that the supporting element and two tangential planes abutting on the latter and extending parallel to the plane of the central sheet metal layer include between them - a multiple within the meaning of the present invention is to be understood as at least threefold, preferably at least approximately fivefold. Also, in accordance with the invention, the hollow space volume can be filled out with a coating, for example, with a heat-resistant resin.

The arch which is to be compressed so as to form the supporting element could initially be a conventional so-called full bead of approximately circular arc-shaped or U-shaped cross section stamped into the second sheet metal layer, which by means of a corresponding pressing tool is then prevented from increasing in its width and is compressed so strongly and reshaped transversely to its longitudinal direction and at least approximately perpendicularly to the plane of the second layer that the hollow space initially formed by the concave side of the bead almost disappears, and the supporting element forms in cross section, in particular, an approximately rectangular block which instead of the hollow space previously formed by the bead now only has a small groove.

Additionally or alternatively, the arch, i. e., in particular, a bead, can, however, also be prevented by a corresponding tool from undergoing an increase in the height of the arch and can also be compressed so strongly and reshaped transversely to its longitudinal extent and parallel to the plane of the second layer that a compact block, in turn, results from the previous arch —if one started with a conventional full bead, the lateral bead legs then lie against one another, and the block has at the most only a very small groove on one of its sides.

In this reshaping procedure or these reshaping procedures, the supporting element can not only be calibrated (in particular, with respect to its height) with a suitable pressing tool, but, in accordance with the invention, also provided with a height profile so that the height of the supporting element varies along the same —such a height profile is known per se in deformation delimiters, i. e., so-called stoppers, and serves to take into account the fact that the components between which the flat gasket is to be clamped do not exhibit the same overall stiffness and/or the clamping forces are not of the same size overall, with the result that when the flat gasket is installed and pressed, the sealing surfaces of the components to be sealed off from one another, which receive the flat gasket between them, are not level surfaces.

If a supporting element which is particularly wide (transversely to its longitudinal direction) is to be produced on a flat gasket, it is proposed, in accordance with the invention, that the supporting element be formed by a plurality of arches extending-approximately parallel to one another and adjacent to one another (these are, in particular, full beads prior to the compression), which in cross section are compressed perpendicularly to the longitudinal extent of the arches so as to form a compact meandering structure; a particularly stable supporting element is then characterized, in particular, by the meander loops of the supporting element lying against one another.

Supporting elements of the kind in question do not have to be at any rate and overall absolutely pressure-resistant and not deformable in their height —a supporting element possessing only slight elastic and/or plastic characteristics will also suffice for many applications. However, embodiments are preferred, in which the supporting element is so dimensioned and the steel of the second layer is so selected that the supporting element will be at least substantially pressure-resistant and not deformable in its height under the pressing forces occurring when installing the flat gasket and under operating conditions.

In particular, when the flat gasket according to the invention is a cylinder head gasket, it may be advantageous for the second sheet metal layer provided with the supporting element or with supporting elements to be arranged between two first sheet metal layers provided with sealing beads. A supporting element or supporting elements can then form one or more stoppers to protect sealing beads of the two first sheet metal layers from excessive deformations.

If the supporting element serves as deformation delimiter for a sealing bead, the supporting element is —in a plan view of the flat gasket —adjacent to the sealing bead.

If the supporting element is only to serve to absorb pressing forces, for example, to protect a cylinder head from warping, it will advantageously be arranged adjacent to an outer edge of the flat gasket.

As will be apparent from the foregoing, the invention also relates to a method for the manufacture of a flat gasket according to the invention, wherein a sheet metal layer consisting of a sufficiently ductile steel, in order to produce the supporting element in an edge area of this sheet metal layer that is delimited by a free edge, is fixed near to and along this edge area, and the at least one arch is stamped into the sheet metal layer in such a way that the free edge is drawn in the direction towards the fixed area of the sheet metal layer. Therefore, with this type of manufacture, the material required for stamping the arch is drawn from the free edge of the sheet metal layer into the area to be reshaped, so that the sheet thickness in the area of the arch is at least not substantially reduced by the stamping of the arch.

Since with this type of stamping of the arch, the free edge of the sheet metal layer (whether it be an outer, i. e., peripheral edge of the sheet metal layer or the edge of an opening provided in the sheet metal layer) is displaced, it is recommended that after formation, i. e., the finishing of the supporting element, this free edge be subsequently punched—in accordance with the invention, the free edge of the edge area of the sheet metal layer, which is provided with the supporting element, therefore only assumes its final shape and position after formation of the final supporting element by punching.

Further features, advantages and details of the invention will be apparent from the attached claims and/or the following description and also the appended drawings of preferred embodiments of the flat gasket according to the invention.

BRIEF DESCRIPTION OF THE DRAWINGS

FIG. 2 shows a section taken along line 2-2 in FIG. 1, a first preferred embodiment of the invention being represented in this section;

DETAILED DESCRIPTION OF THE INVENTION

Figure 1:
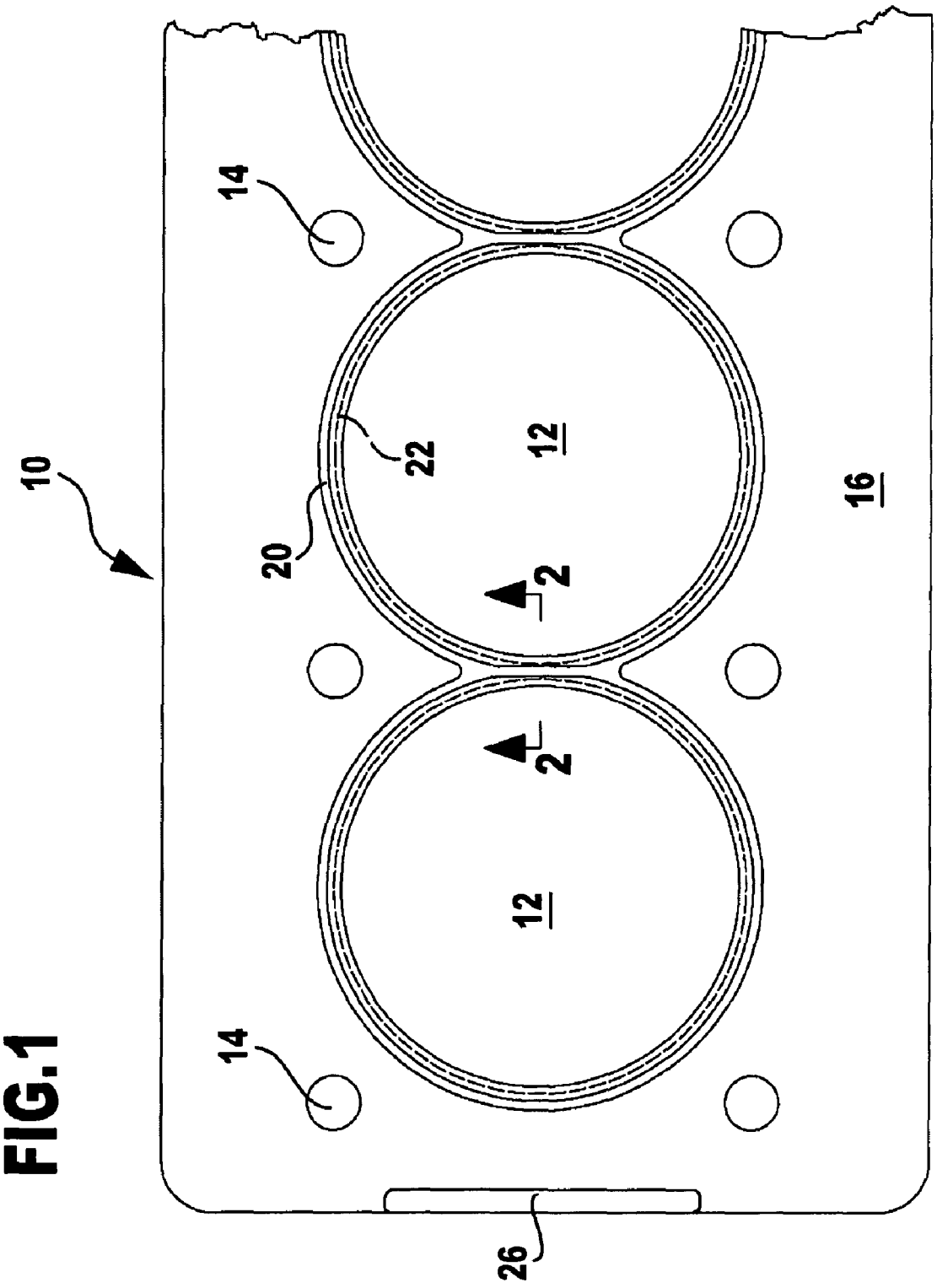
FIG. 1 shows a plan view of part of a cylinder head gasket according to the invention.

The cylinder head gasket shown partially in FIG. 1 has a gasket plate generally designated 10 with a plurality of combustion chamber openings 12 and screw holes 14 for the passage of cylinder head screws therethrough. The gasket plate 10 is made up of three sheet metal layers, namely two first, outer sheet metal layers 16 and a second, inner sheet metal layer 18 arranged between these. A sheet spring steel was used for the manufacture of the two outer sheet metal layers 16, a sheet metal consisting of a relatively ductile steel for the inner sheet metal layer 18. Each of the outer sheet metal layers 16 has a sealing bead 20 in the form of a full bead around each combustion chamber opening 12. In embodiments modified somewhat in relation to the embodiment shown, with a somewhat larger spacing of the combustion chamber openings 12 from one another, each of these sealing beads 20 would form a circular ring closed within itself. In the embodiment shown, however, owing to the slight spacing of the combustion chamber openings 12 from one another, in each of the outer sheet metal layers 16 the sealing beads 20 of neighboring combustion chamber openings 12 must necessarily merge in the area of the web of the gasket plate 10 extending between the combustion chamber openings 12 in such a way that each of the two outer sheet metal layers 16 only has a single sealing bead 20 in the web area. As will be particularly clear from FIG. 2, the sealing beads 20 are not arranged directly at the edges of the combustion chamber openings 12, but are spaced at a small radial distance from these.

For each of the combustion chamber openings 12 the inner sheet metal layer 18 is provided with a stopper which has the shape of a circular ring in a plan view of the gasket plate 10. This stopper is a thickened portion of the inner sheet metal layer 18, and this thickened portion forms a supporting element 22 within the meaning of the present invention. When the cylinder head gasket is installed, i. e., pressed, and during operation of the engine, the supporting elements 22 delimit the flattening of the sealing beads 20 and thereby protect them from damage due to excessive deformation. The configuration of the supporting elements 22 will be explained in detail with reference to FIGS. 3A to 3C.

Additionally or alternatively, the cylinder head gasket may comprise on the inner sheet metal layer 18 peripheral supporting elements according to the invention, only one supporting element 26 of which is shown in FIG. 1 (it should actually be shown in dashed representation in FIG. 1, as it is covered by the upper sheet metal layer 16). While the supporting elements 22 border on free inner edges of the gasket plate 10, the supporting element 26 borders on a free peripheral edge of the gasket plate 10.

Figure 3A:
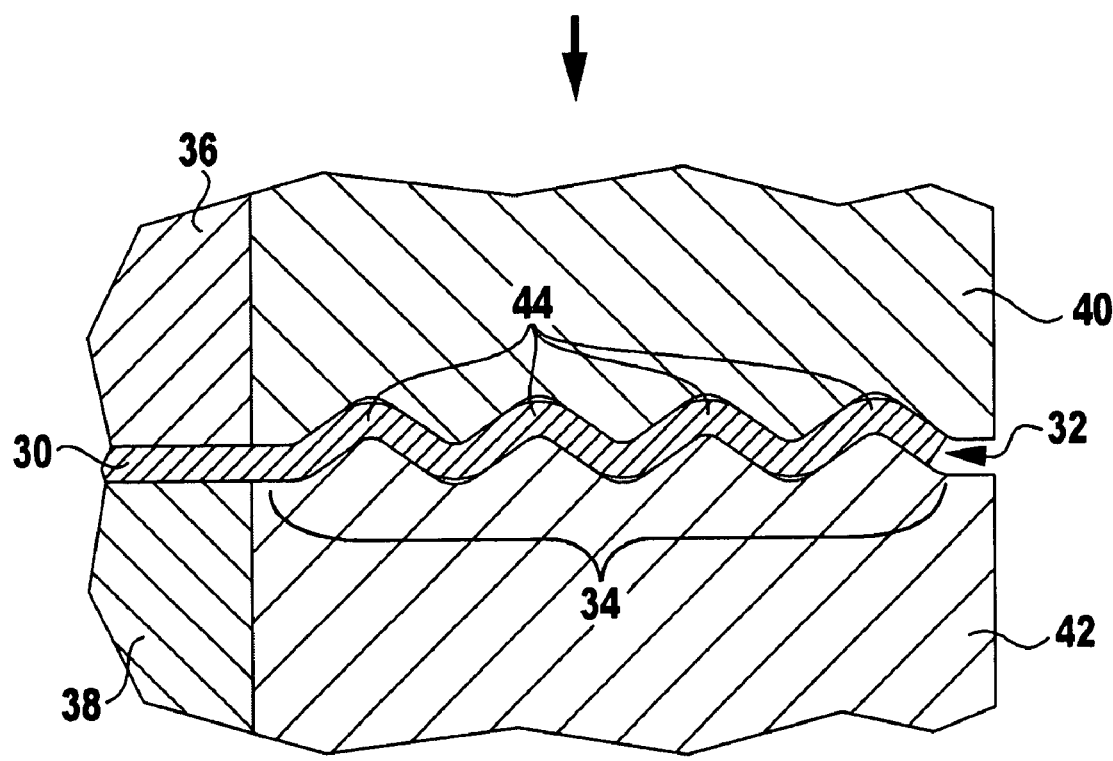
FIGS. 3A to 3C show three successive steps in the manufacture of the first embodiment of a supporting element according to the invention.
Figure 3B:
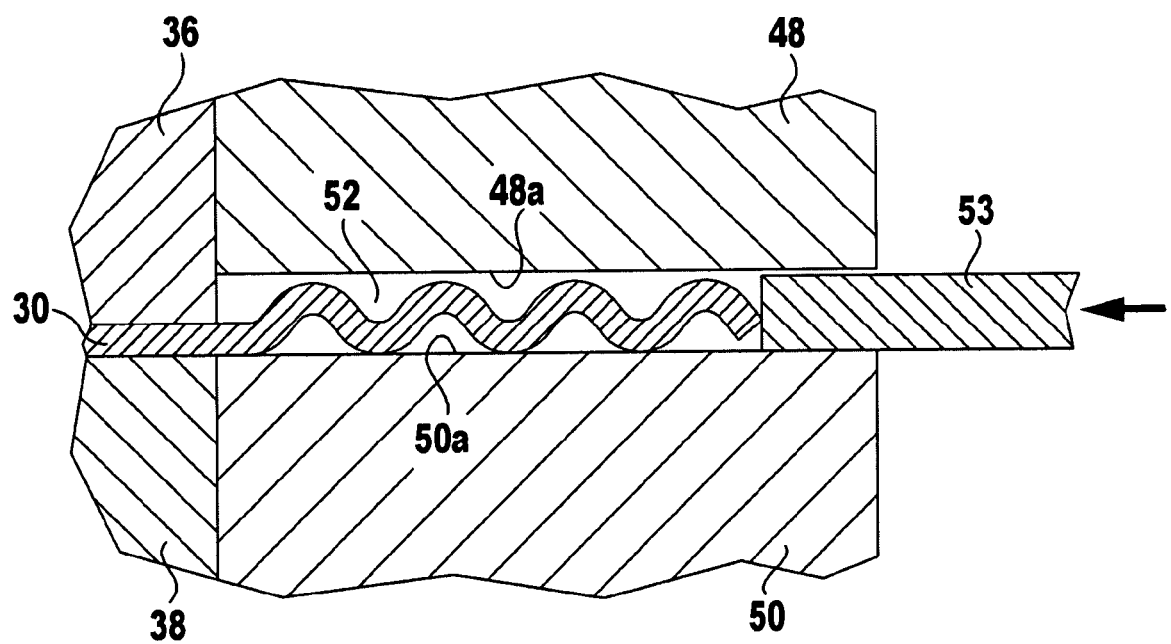

To manufacture a supporting element according to the invention on a sheet metal layer such as the inner sheet metal layer 18 of the cylinder head gasket shown in FIGS. 1 and 2, a flat sheet metal layer 30 (see FIG. 3A) consisting of a relatively ductile steel is used as starting point. This has a free edge 32 which, after finishing of this sheet metal layer, forms a peripheral, outer edge of the sheet metal layer or an inner free edge around an opening of the sheet metal layer (possibly after a subsequent punching described hereinabove). Adjoining this edge 32 is an edge area 34 of the sheet metal layer 30, which forms a narrow strip extending parallel to the edge 32. As FIGS. 3A and 3B show, the sheet metal layer 30 is fixed outside the edge area 34, namely by means of two clamping jaws 36 and 38, which are only displaceable relative to each other perpendicularly to the sheet metal layer 30, but are otherwise stationary. Subsequently, an undulating profile is stamped into the edge area 34, namely by means of a stamping tool comprising an upper tool portion 40 and a lower tool portion 42. This undulating profile is comprised of a number of bead-like arches 44 which extend parallel to one another and to the free edge 32. Advantageously, the tool portions 40 and 42 are so configured and, when made to approach each other to the maximum extent, so positioned that the bead feet, i. e., the bottom crests of the undulating profile in accordance with FIG. 3A, lie in a plane which is in alignment with the underside of the area of the sheet metal layer 30 clamped between the clamping jaws 36, 38. As will be apparent from FIG. 3A, during the stamping of the arches 44, the free edge 32 has shifted towards the left in accordance with FIG. 3A, i. e., in the direction towards the area of the sheet metal layer 30 clamped between the clamping jaws 36, 38—this must, of course, be made possible by the frictional conditions between the sheet metal layer and the stamping tool portions, a technique with which any person skilled in the art of stamping or deep-drawing of metal sheets is, however, familiar.

Figure 3C:
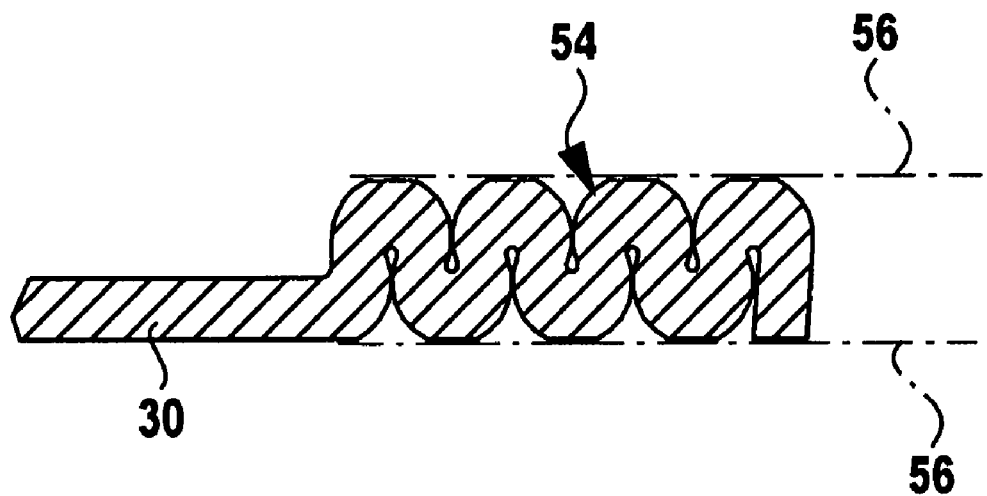

For the next step, two limiting jaws 48 and 50 whose end faces 48a and 50a facing each other include between them a gap 52 whose height corresponds to the thickness of the inventive supporting element to be produced are substituted for the stamping tool portions 40 and 42. Optionally, one or both of the end faces 48a, 50a can be of such topographical configuration that the supporting element to be produced has a corresponding height profile. A stamp 53 is introduced into this gap, with which the edge area 34 of the sheet metal layer 30 that is provided with the undulating profile is compressed in horizontal direction in accordance with the drawings, namely in the direction towards the fixed area of the sheet metal layer 30, until the legs of the beads forming the arches 44 lie against one another, as shown in FIG. 3C. In this way, an: inventive supporting element 54 shown in FIG. 3C is produced. This may be a stopper associated with a sealing bead or it may be a supporting element like the supporting element 26 from FIG. 1. If the supporting element 54 is not a straight elongate element, but a supporting element with an arcuate course (in this case, the edge area 34 shown in FIG. 3A also has an arcuate course in a plan view of the sheet metal layer 30), several stamp segments which are respectively moved outwards in radial direction are substituted for the stamp 53, or, for example, an expandable ring which is circumferentially uniformly expandable hydraulically or in some other way is substituted for the stamp 53.

From FIG. 3C it will be clearly apparent that in the case of the supporting element 54 according to the invention, its metal volume is at least ten times that of the total hollow space volume which the supporting element and two tangential planes 56 abutting on the support element and extending parallel to the plane of the sheet metal layer 30, i. e., horizontally in accordance with FIG. 3C include between them, since this hollow space volume is formed by very small grooves remaining at the top and the bottom on the supporting element 54 and by hollow spaces of very much smaller cross section which the meander loops forming the supporting element 54 include between them.

In FIGS. 4A to 4D, as far as possible, the same reference numerals were used as in FIGS. 3A to 3C, but with the addition of a prime, and because the embodiment according to FIGS. 4A to 4D is not overly different from the previously described embodiment, only the differences will be explained in the following.

A profile is stamped into the edge area 34' of the sheet metal layer 30' clamped between the clamping jaws 36' and 38' using the tool portions 40' and 42'. The cross section of the profile resembles a flat W and continues via a cross-sectional taper 43' into the clamped area of the sheet metal layer 30'. Accordingly, the cross-sectional profile of the edge area 34' has an arch 44' and two upwardly inclined legs 44a' and 44b'. In a method step not represented in the drawings, the edge area 34' is bent upwards through 90° around the cross-sectional taper 43' so as to produce the shape of the sheet metal layer 30' shown in FIG. 4B. The lower clamping jaw 38' is then moved somewhat to the right in accordance with the drawings, so that it assumes the position shown in FIG. 4B. Thereupon, the edge area 34' is compressed transversely to its longitudinal extent by a stamp 54' shown in FIG. 4B, the edge area 34' being so enclosed between the stamp 54' and the clamping jaw 36' that the edge area 34' is unable to warp or arch in horizontal direction in accordance with the drawings. Subsequently, the edge area 34' is swiveled downwards again around the cross-sectional taper 43' by a stamp 54a' shown in FIG. 4C and then further compressed between two tool portions 48' and 50' in a direction perpendicular to its longitudinal extent and perpendicular to the plane of the sheet metal layer 30', so that a compact supporting element 54' results, whose cross section corresponds almost to a rectangle, but whose thickness is significantly greater than the thickness of the original sheet metal layer 30'.

Figure 4A:
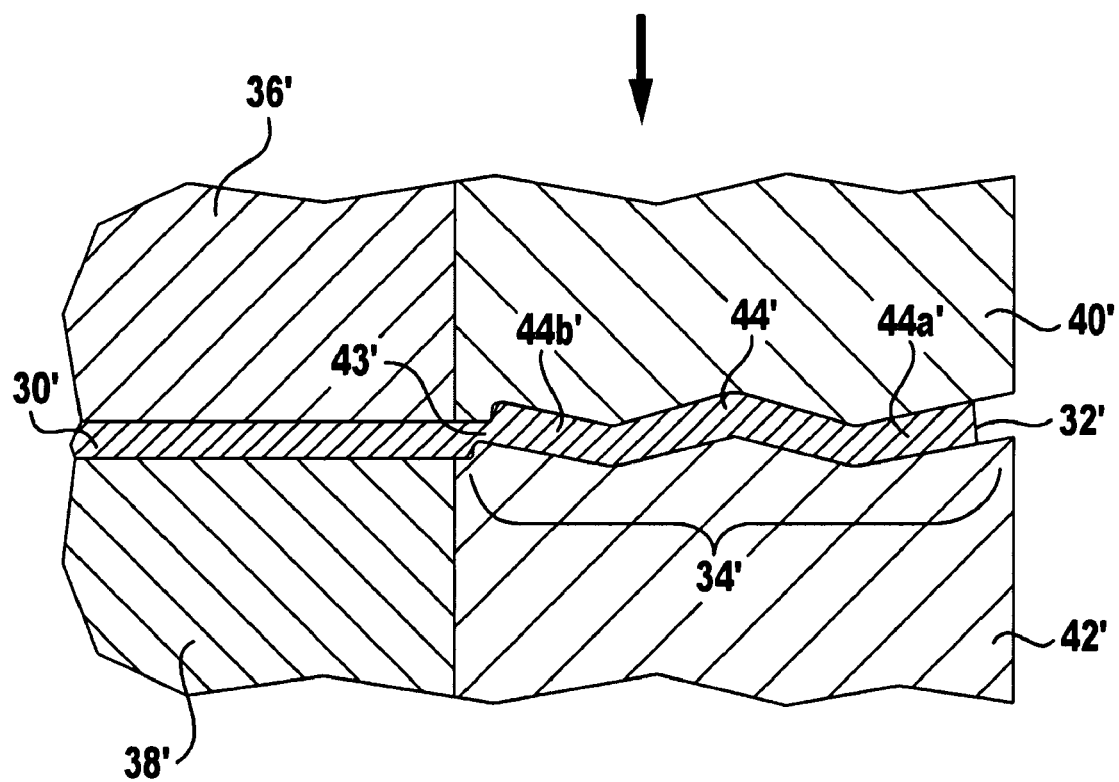
FIGS. 4A to 4D show four successive steps in the manufacture of a second preferred embodiment of a supporting element according to the invention as well as the finished supporting element.
Figure 4B:
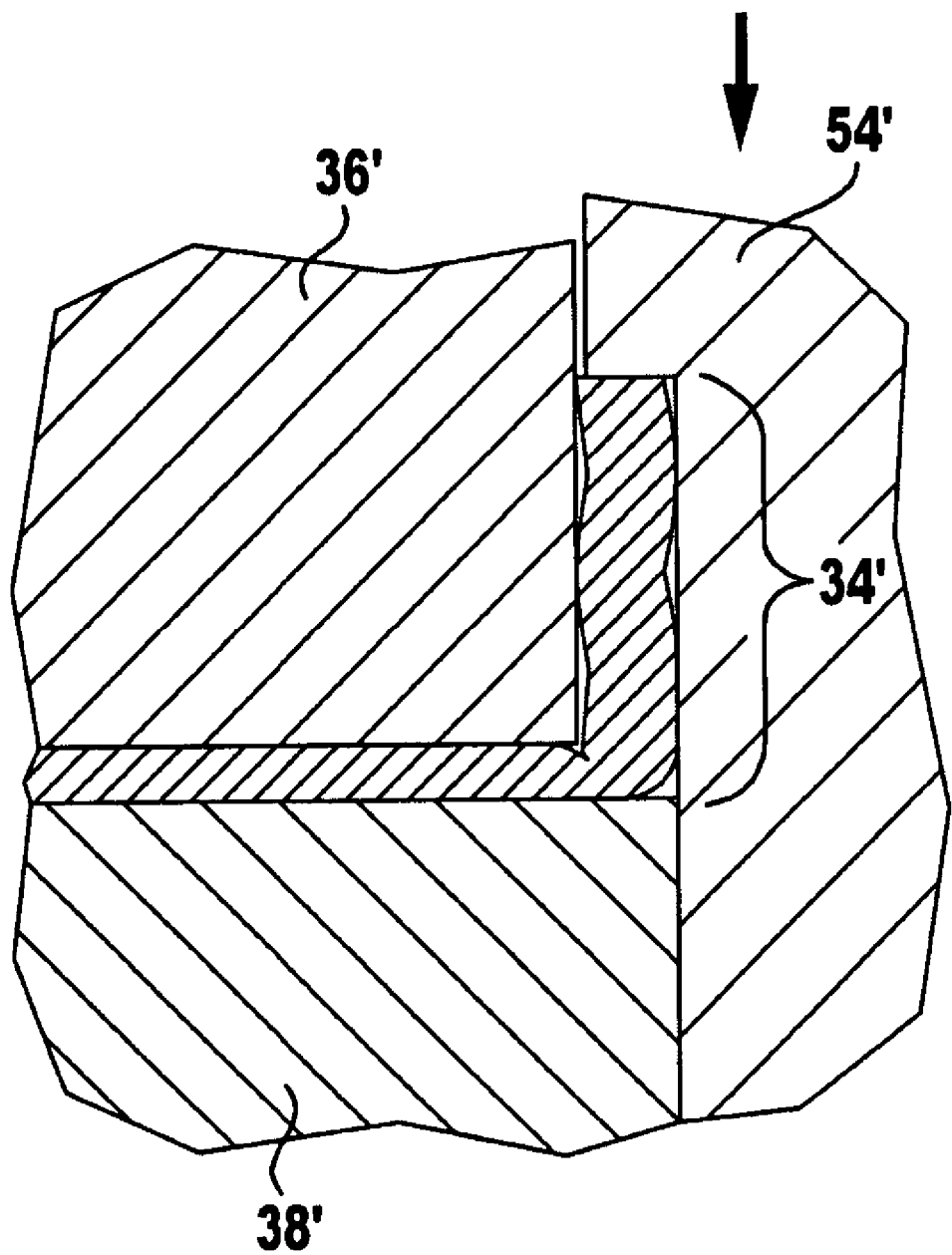
Figure 4C:
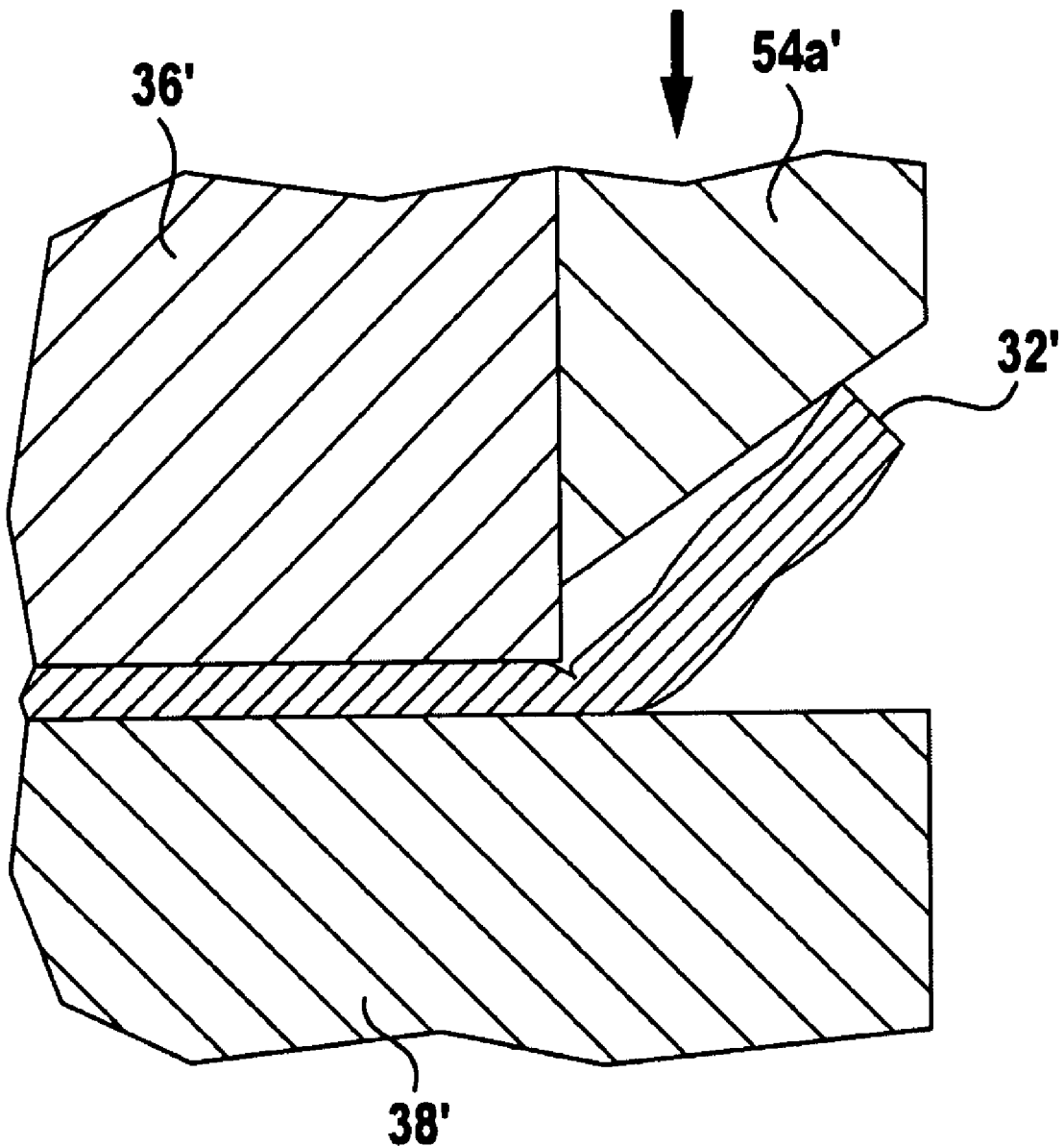
Figure 4D:
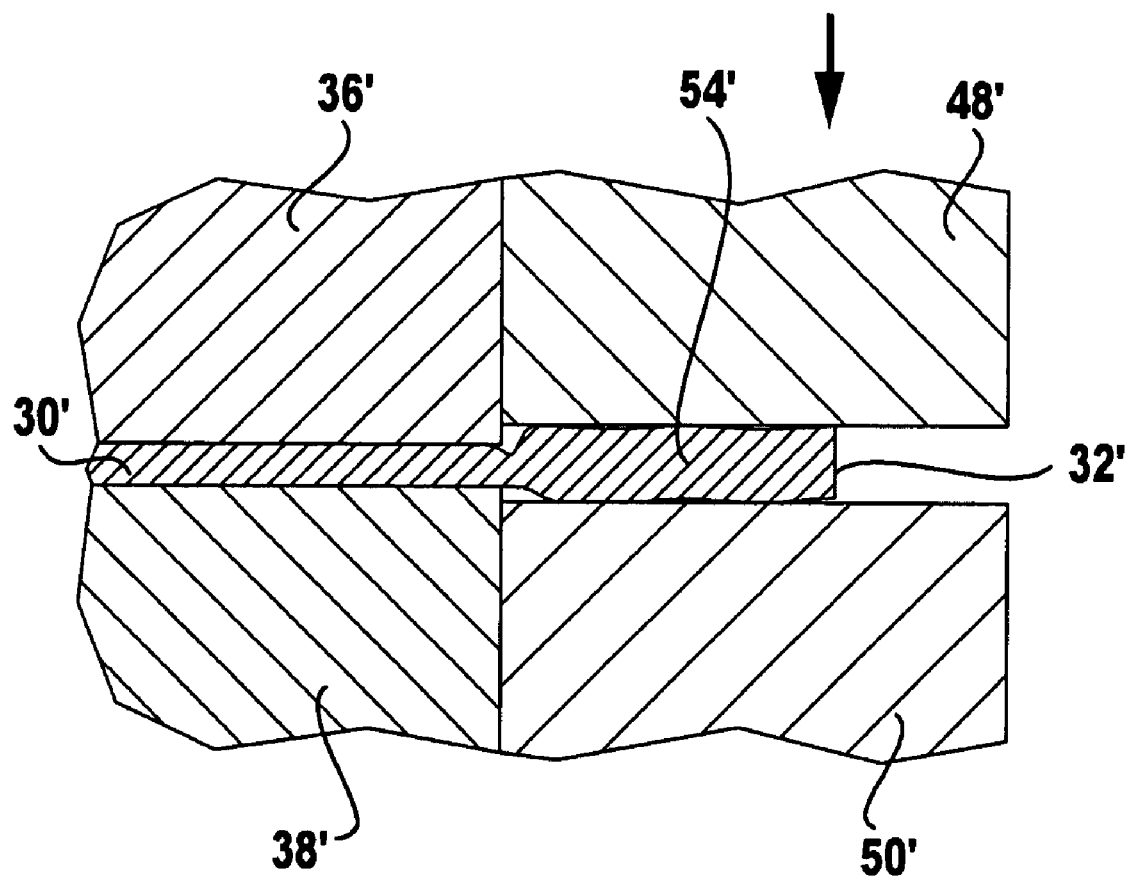
Figure 5A:
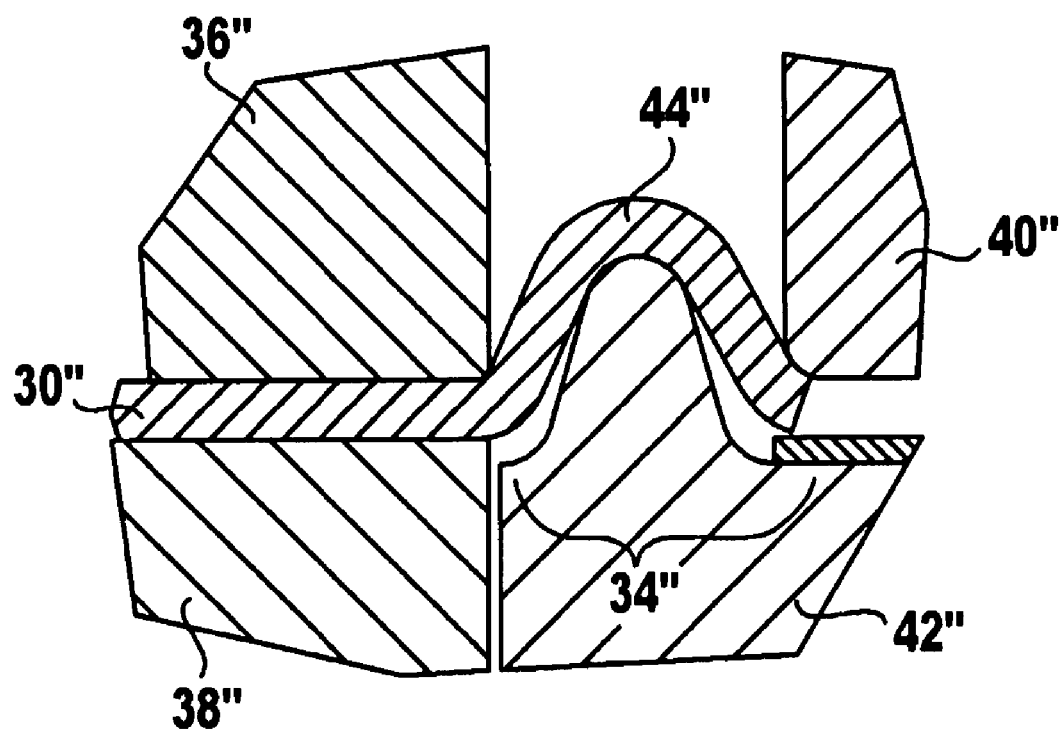
FIGS. 5A to 5D show four successive steps in the manufacture of a third embodiment of a supporting element according to the invention as well as the finished supporting element.
Figure 5B:
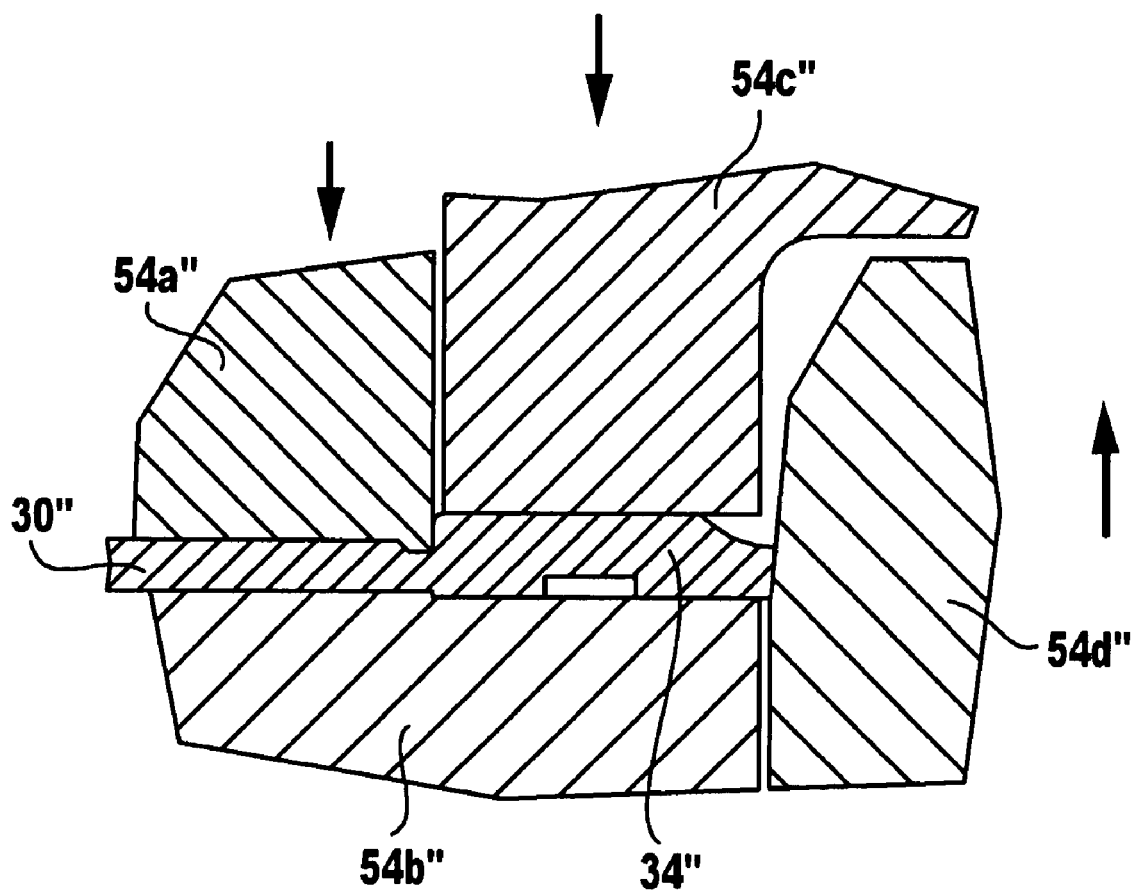
Figure 5C:
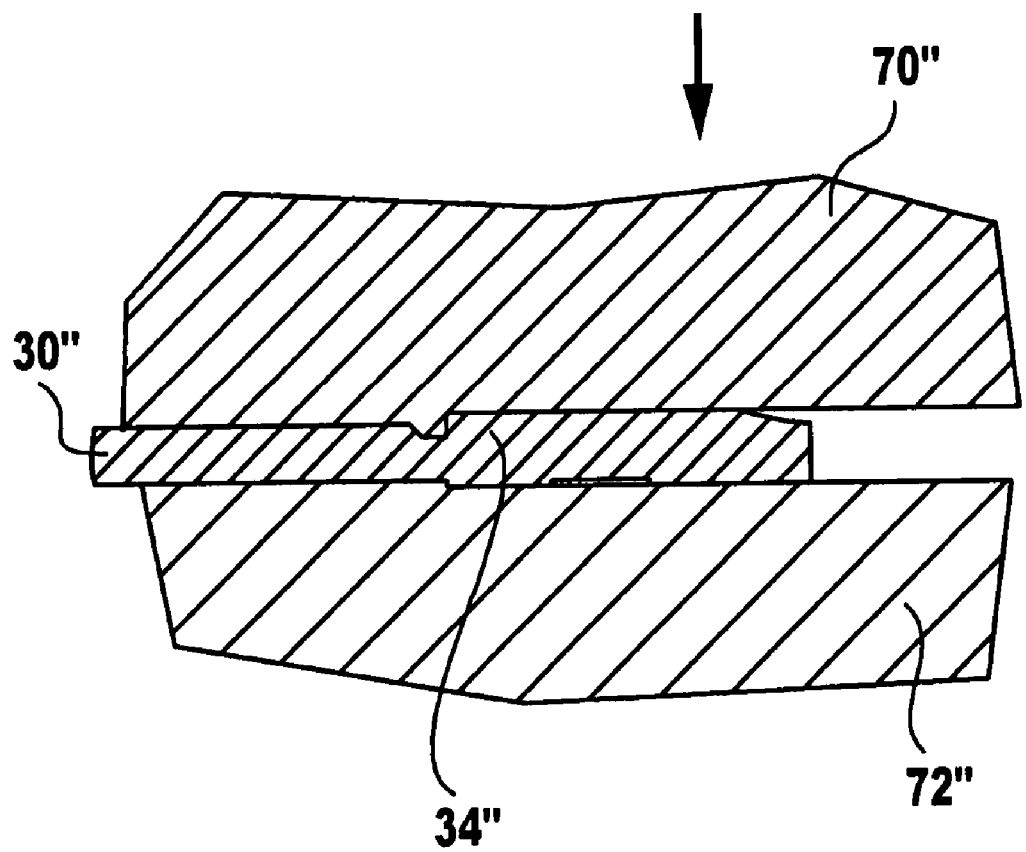
Figure 5D:
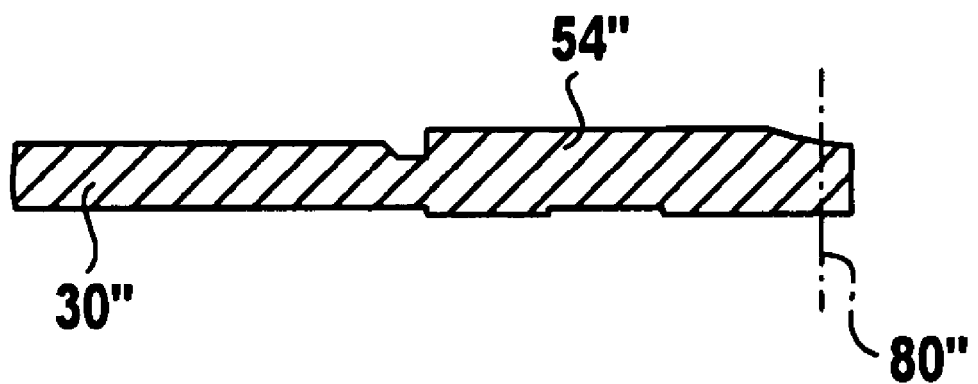

In this second embodiment, too, the free edge 32' of the edge area 34' shifts towards the left in accordance with the drawings during the stamping procedure represented in FIG. 4A.

In the third embodiment shown in FIGS. 5A to 5D, a bead-like arch 44" is stamped into an edge area 34" of a sheet metal layer 30" again fixed between two clamping jaws 36" and 38", using a stamping tool comprising an upper tool portion 40" and a lower tool portion 42". The edge area 34" is then compressed and reshaped in a multi-part stamping tool shown in FIG. 5B. This stamping tool has an upper stamp die 54a", a lower stamp die 54b", a press die 54c" and an abutment die 54d". The directions of movement of these tool portions are indicated by arrows in FIG. 5B. The edge area 34" is compressed not only perpendicularly to the plane of the sheet metal layer 30" but also in horizontal direction in accordance with the drawings by the inclined faces on the left side of the abutment die 54d" in accordance with the drawings and by the press die 54c". A cross-sectional profile of the edge area 34" thus results, which in the technical terminology of the structural designer of metallic flat gaskets would be referred to as rectangular bead whose cross section corresponds almost to a rectangular block with a small groove on the underside. In a two-part pressing tool shown in FIG. 5C with a pressing tool upper portion 70" and a pressing tool lower portion 72" the edge area 34" is further compressed in vertical direction, so that the above-mentioned groove disappears almost completely and a supporting element 54" according to the invention results, whose cross section is almost rectangular, but which has a larger thickness than the original sheet metal layer 30". As indicated by a vertical dot-and-dash line 80" in FIG. 5D, punching can be carried out subsequently in order that the free edge of the sheet metal layer 30" will assume its final shape and position.

The invention claimed is:

1. A method for manufacturing a flat gasket, the flat gasket comprising at least one first sheet metal layer consisting of a spring steel and at least one second sheet metal layer consisting of a ductile steel, said first layer being provided with at least one sealing bead, and said second layer being provided in at least one edge area bordering on an edge of the second layer with at least one thickened zone as supporting element for receiving pressing forces acting on the flat gasket when said flat gasket is installed, wherein the method includes:

forming the supporting element in an edge area of the second sheet metal layer that is delimited by a free edge, wherein the second layer is first fixed in a fixed area near to and along this edge area, and wherein at least one arch is then stamped into said edge area in such a way that the free edge is thereby drawn in the direction towards said fixed area of the second sheet metal layer and that said at least one arch extends approximately parallel to said free edge, and then compressing the at least one arch in such a way that the metal volume of the supporting element is a multiple of the total hollow space volume which said supporting element and two tangential planes abutting on the latter and extending parallel to the plane of the second layer include between them.

2. A method in accordance with claim 1, wherein the at least one stamped arch is compressed transversely to its longitudinal extent and parallel to the plane of the edge area of the second sheet metal layer.

3. A method in accordance with claim 2, wherein the edge area of the second sheet metal layer is held during the compressing between stationary and level delimiting surfaces which extend parallel to the plane of the edge area of the second sheet metal layer.

4. A method in accordance with claim 1, wherein the at least one arch is compressed transversely to its longitudinal extent and transversely to the plane of the edge area of the second sheet metal layer.

5. A method in accordance with claim 1, wherein after formation of the supporting element, the free edge of the edge area of the second sheet metal layer that is provided with the supporting element is given its final shape and position by punching.

6. A method in accordance with claim 2, wherein the edge area provided with the at least one arch is pressed from the adjacent free edge of the second sheet metal layer and the overall thickness of the edge area is thereby increased.

7. A method for manufacturing a flat gasket, the flat gasket comprising at least one first sheet metal layer consisting of a spring steel and at least one second sheet metal layer consisting of a ductile steel, said first layer being provided with at least one sealing bead, and said second layer being provided in at least one edge area bordering on an edge of the second layer with at least one thickened zone as supporting element for receiving pressing forces acting on the flat gasket when said flat gasket is installed, wherein the method includes:

forming the supporting element in an edge area of second sheet metal layer that is delimited by a free edge, including fixing the second layer in a fixed area near to and along this edge area, and stamping at least one arch into the edge area in such a way that the free edge is thereby drawn in the direction towards the fixed area of the second sheet metal layer and that said at least one arch extends approximately parallel to the free edge, compressing the at least one arch transversely to its longitudinal extent and parallel to the plane of the edge area of the second sheet metal layer to increase the overall thickness of the supporting element at the edge area, and then compressing the supporting element approximately perpendicularly to its longitudinal extent and approximately perpendicularly to the plane of the edge area while retaining its overall thickness greater than the thickness of the original second sheet metal layer.

* * * * *

UNITED STATES PATENT AND TRADEMARK OFFICE
CERTIFICATE OF CORRECTION

PATENT NO. : 7,913,386 B2  
APPLICATION NO. : 11/789540  
DATED : March 29, 2011  
INVENTOR(S) : Ulrich Werz et al.

Page 1 of 1

It is certified that error appears in the above-identified patent and that said Letters Patent is hereby corrected as shown below:

TITLE PAGE, ITEM (75) INVENTORS: SHOULD READ,

-- [75] Inventors:     Ulrich Werz, Dettingen (DE);  
Tobias Gruhler, Pfullingen (DE);  
Peter Schenk, Hohenstein (DE);  
Wolfgang Fritz, Metzingen (DE);  
Willi Brodbeck, Dettingen (DE);  
Matthias Baur, Roemerstein (DE);  
Armin Diez, Lenningen (DE) --.

Signed and Sealed this  
Thirty-first Day of May, 2011

David J. Kappos  
*Director of the United States Patent and Trademark Office*